United States Patent [19]
Walters

[11] 4,121,949
[45] Oct. 24, 1978

[54] METHOD OF MAKING A CATHODE ELECTRODE FOR AN ELECTROLYTIC CAPACITOR

[75] Inventor: Charles W. Walters, Indianapolis, Ind.

[73] Assignee: P. R. Mallory & Co. Inc., Indianapolis, Ind.

[21] Appl. No.: 757,339

[22] Filed: Jan. 6, 1977

Related U.S. Application Data

[62] Division of Ser. No. 681,924, Apr. 30, 1976, Pat. No. 4,016,465.

[51] Int. Cl.² .............................................. H01G 9/24
[52] U.S. Cl. ............................... 148/6.14 R; 148/6.24; 427/80; 361/433
[58] Field of Search ........... 427/80; 148/6.31, 6.14 R, 148/6.24; 361/433; 429/220; 252/62.2

[56] References Cited

U.S. PATENT DOCUMENTS

| | | | |
|---|---|---|---|
| 1,308,092 | 7/1919 | Mathers et al. | 148/6.24 |
| 2,710,369 | 6/1955 | Booe | 361/433 |
| 2,871,424 | 1/1959 | Aikman | 361/433 |
| 2,871,426 | 1/1959 | Hilton et al. | 148/6.24 |
| 2,937,594 | 5/1960 | Miesse et al. | 148/6.24 X |
| 3,243,316 | 3/1966 | O'Nan et al. | 427/80 |

*Primary Examiner*—Ralph S. Kendall
*Attorney, Agent, or Firm*—Hoffmann, Meyer & Coles

[57] ABSTRACT

A cathode electrode of copper-based material adapted for use in an electrical device is provided with a layer composed of at least one compound from the group of copper selenide, copper telluride and copper sulfide by the reaction between the copper-based cathode electrode and an appropriate reactive compound of selenium, tellurium or sulfur. When utilized in an electrolytic capacitor, the layer on the cathode electrode helps to depolarize the capacitor and helps to increase the capacitance of the cathode electrode.

3 Claims, 1 Drawing Figure

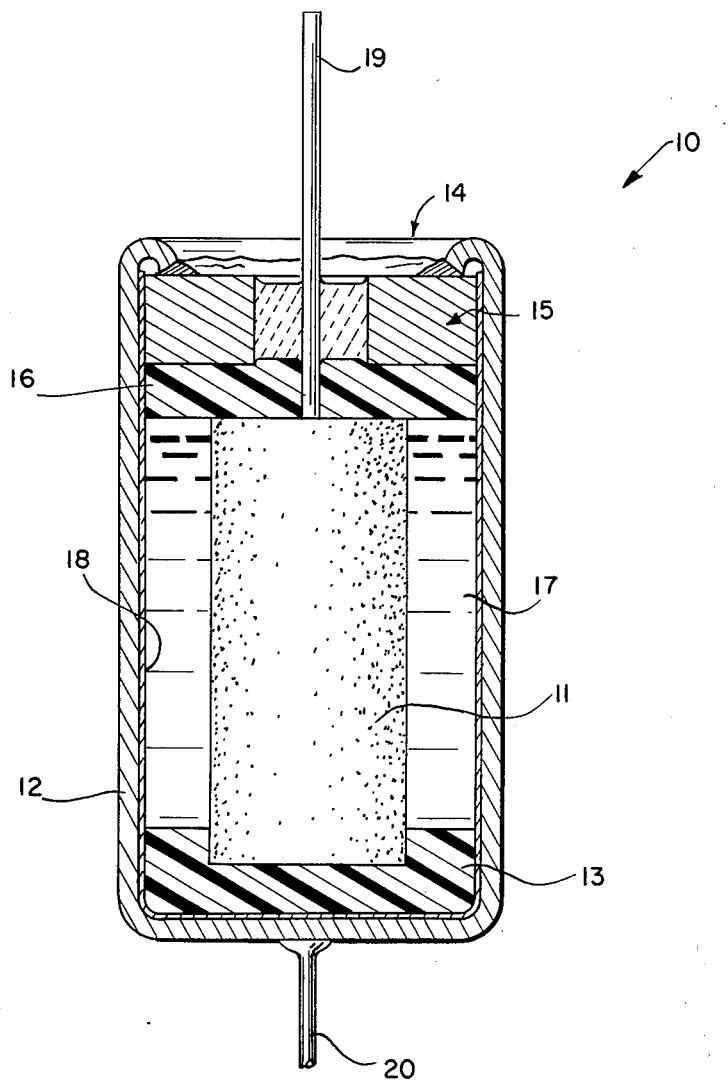

METHOD OF MAKING A CATHODE ELECTRODE FOR AN ELECTROLYTIC CAPACITOR

This is a division of application Ser. No. 681,924, filed now Pat. No. 4,016,465.

The present invention relates to electrical devices, and more particularly, to cathode electrodes adapted for use in electrolytic, dielectric oxide film-forming metal anode capacitors and the like.

While the present invention will be discussed hereinafter with reference to use in electrolytic capacitors, it is to be understood that the invention may be utilized in a variety of other electrical devices where a cathode electrode is required.

Electrolytic capacitors of the sintered dielectric oxide film-forming metal anode type generally consist of a cathode electrode, an electrically conductive electrolyte and a porous anode with a dielectric oxide film formed thereon. Typically, the cathode electrode is composed of silver, an alloy of silver, copper, or an alloy of copper to impart high electrical conductivity and corrosion resistance, the electrolyte is an aqueous solution of an inorganic acid, and the anode is composed of a film-forming metal such as tantalum, aluminum, or niobium, preferably tantalum. Certain inorganic salts may be added to the electrolyte, for example see U.S. Pat. No. 2,616,953 granted to J. M. Booe, to act as a depolarizer and to thereby help prevent the formation of potentially damaging gaseous products and films on the cathode electrode surface.

In most situations, the cathode electrode also functions as the case or housing for the electrolytic capacitor by surrounding and retaining both the anode and the electrolyte. Present practice is to utilize silver as a main constituent of the cathode electrode because of the desireable electrical and chemical properties of silver. Due to the relatively high cost of silver, it would be advantageous to use copper or copper alloys for the cathode electrode while still retaining the performance characteristics of silver-based cathode electrodes.

The anode in this type of electrolytic capacitor is generally formed by pressing powders of the particular film-forming metal into the desired shape and then sintering the pressed powder. The resultant sintered anode is characterized as having a myriad of interconnecting void areas and therefore has a very large surface area per unit of volume which contributes greatly to the capacitance of the device in which it is utilized. A dielectric oxide film of the metal is then formed over the anode, typically by an electrolytic anodization process.

While the anode exhibits a relatively large capacitance, the interface between the cathode electrode and the electrolyte has an inherent charge separation due to polarization and thus exhibits a cathodic capacitance. This cathodic capacitance due to polarization may result from the formation of an asymmetric conductive film on the cathode electrode surface or from electrochemically developed insoluble insulating films or gas polarization films on the cathode electrode surface.

Since both the anode and cathode electrode possess inherent asymmetric conducting properties, the two electrodes are series-opposed with respect to their arrangement in the capacitor structure. When under the influence of an applied pulsating voltage, the electrodes charge and discharge alternately; that is, one electrode discharges as the other charges. As a consequence, the electrolyte between the electrodes remains at a negative potential toward the external electrodes throughout an alternating cycle. This differs from the charge-discharge function of two ordinary electrostatic capacitors connected in series, however, the law governing the admittance of the circuit remains the same: $1/C$ (device) $= 1/C$ (anode) $+ 1/C$ (cathode) where C is capacitance. This relationship results in the condition that the charge transfer is limited by the smaller of the two capacitances in either arrangement.

In the design of electrolytic capacitors, particularly relating to capacitor rating, the design is established invariably from the design parameters of the anode. Therefore the cathode capacitance should be made several orders of magnitude higher than the anode capacitance by suitable arrangement or treatment so as to be compatible with the anode design. Thus, the term $1/C$ (cathode) in the above relation would become small relative to the other terms and the device capacitance would become essentially equal to the anode capacitance. Ideally, the operating characteristics of the capacitor approach optimum stability as the cathode capacitance approaches infinity. This condition, of course, can be attained only approximately in practical design of capacitors.

Several methods are known to increase the capacitance of the cathode electrode in electrolytic, film-forming metal capacitors and they include;

(1) applying to the surface of the cathode electrode a layer of finely divided, substantially inert conductive material such as carbon or certain of the platinum metals or gold; when properly applied, these materials provide a very high cathode surface area necessary for cathode capacitance, or (2) providing certain metal ions in the electrolyte which are capable of being electro-deposited on a cathode electrode of a suitable metal and dissolved therefrom is substantially the exact proportion of the current flowing back and forth across the cathode-electrolyte interface.

In system (1) it is thought that the current traversing the electrolyte-cathode junction discharges hydrogen or hydroxyl ions which are absorbed on the surface of the metal to yield a dielectric film. In system (2), it is believed the electrochemical discharge and dissolution of metal ions creates an ionic double layer in the electrolyte at the cathode electrode surface, and the space charge across this layer exhibits a high capacitance.

Since film-forming metal anode type capacitors are usually made as small as possible and the anode capacitance is therefore very high per device volume, the usual practice is to employ both methods of increasing the capacitance of the cathode electrode. However, applying the layer of finely divided conductive material to the surface of the cathode electrode is generally tedious and costly, especially when gold or platinum are utilized. The method generally involves the steps of cleaning the cathode, applying a coat of masking material over a portion of the cathode electrode surface, etching the surface with an acid, rinsing, filling with plating solution, electroplating with a platinum anode, removing the anode and plating solution, rinsing, drying and removing the mask material.

It is therefore a feature of the present invention to provide a copper-based cathode electrode for an electrical device with a layer or coating thereon to help increase the capacitance of the cathode by increasing the effective surface area of the cathode electrode. Another feature of the present invention is that the layer applied to the cathode electrode contains at least one compound selected from copper selenide, copper telluride and copper sulfide. Yet another feature of the present invention is that the method of applying the layer includes relatively few process steps and is therefore comparatively inexpensive. Another feature is that a copper-based cathode electrode with a layer according to this invention is substantially non-film forming, is non-gassing, offers minimal internal series resistance, stabilizes electrical characteristics of the capacitor and is substantially inert to corrosive chemical attack by an operating electrolyte. Yet another feature of the present invention is that the electrolyte with which the copper-based cathode electrode is in contact is deaerated so as to reduce the possibility of corrosion of the cathode electrode by oxidizing substances in the electrolyte. These and various other features of this invention as well as many specific advantages will become more fully apparent from a detailed consideration of the remainder of this disclosure including the examples and the appended claims in conjunction with the accompanying drawing, in which the figure is a cross-sectional view of a typical electrolytic, film-forming metal anode capacitor.

Generally, the present invention comprehends a cathode electrode for an electrical device wherein the cathode electrode is composed of a copper-based material and has a layer or coating over the cathode electrode surface of a compound selected from the group consisting of copper telluride, copper selenide, copper sulfide and mixtures thereof. The invention also comprehends a method for applying the layer to the cathode electrode surface. The invention is particularly adapted for use in electrolytic, film-forming metal anode capacitors where a high cathodic capacitance and stable electrical characteristics are desired.

As indicated previously, the present invention can be utilized in various electrical devices but will be discussed hereinafter with reference to its application in electrolytic capacitors although not limited thereto. The main advantages realized by the utilization of a copper-based cathode electrode are a significant reduction in the final cost of the completed capacitor without a reduction in performance capability as compared to capacitors having platinized silverbased cathode electrodes, and the ease of forming the layer over the cathode electrode surface.

The invention can be more clearly understood with reference to the drawing. The figure is a cross-sectional view of an electrolytic capacitor 10 containing a dielectric oxide film-forming metal anode 11 with anode riser 19.

The anode 11 has a dielectric oxide film or layer (not shown) over its surface. In combination with anode 11 is cathode electrode 12 which also serves as the housing or case for capacitor 10. The anode 11 is retained within the cathode housing 12 by means of the insulative bottom spacer 13 and end seal assembly 14. End seal assembly 14 is shown as a glass-to-metal seal 15 in conjunction with a resiliant washer 16, but the end seal assembly forms no part of the present invention and, as is known in the art, a wide variety of different types of structures may be employed to close the open end of the housing 12. Electrolyte 17 contacts the anode 11 and the interior surface coating 18 of the cathode electrode 12. External electrical termination for the cathode electrode is provided by cathode lead 20.

The operating electrolyte 17 for the capacitor is typically a dilute, non-oxidizing aqueous solution of an inorganic acid such as sulfuric acid, phosphoric acid, hydrochloric acid, and the like. The presently preferred electrolyte is a 39 wt.% solution of sulfuric acid. To help prevent corrosion of the interior surfaces of the cathode electrode 12 by the electrolyte 17, preferably the electrolyte is de-aerated by means such as refluxing in a closed system before being added to the capacitor 10.

According to the present invention, the cathode electrode 12 is composed of a copper-based material, that is, a material containing at least 50 wt.% copper. Preferably, the copper-based material contains at least 90% copper. One particularly advantageous material is argentiferous copper, CDA #116, which is a copper based alloy containing about 25 troy ounces of silver per ton of copper, or about 0.1 wt.% silver. This copper alloy has desirable mechanical properties such as ductility, retention of work-hardened temper over the operating temperature range of a typical capacitor, and good corrosion resistance.

As mentioned previously, the surface area of the case or housing acting as a cathode electrode 12 in the capacitor 10 should be significantly increased so as to take full advantage of the capacitance of the anode 11. Conventional methods of accomplishing this end include platinization by electrochemical means and application of an artifical graphite coating by means of a liquid dispersion or paint.

While conventional methods may be adequate for some purposes, it has been found that treatment of the interior of the cathode electrode 12 can be accomplished in fewer steps, and therefore generally at a lower cost, by forming a coating 18 of copper selenide, copper telluride or copper sulfide by reaction of a solution of the appropriate acid or other reactive compound with the copper-based cathode electrode 12. Thus, for example, a reaction of seleneous acid with the copper-based cathode electrode 12 would produce a coating 18 of copper selenide, tellurous acid would yield copper telluride and a polysulfide would produce copper sulfide. The presently preferred compound for the coating 18 over the cathode electrode 12 is copper telluride. Generally, the quantity of acid or compound required to form the coating 18 is in the range of about 0.2 to 1.0 milligrams per square centimeter of cathode electrode surface.

The coating 18 formed by the reaction product of the reactive acids or compounds with the cathode electrode 12 may be applied at several different stages of the capacitor assembly. The appropriate compound may be added to the fill electrolyte 17 and thus the reaction takes place in the completed capacitor 10. Alternatively, the porous anode 11 may be dipped in an aqueous solution of the appropriate compound and then dried. The reaction will commence when the anode 11 is inserted into the electrolyte 17 and any unreacted compound will thereby remain in the capacitor 10. In another method, an aqueous solution of the compound is placed in a dry housing 12 and the reaction with the cathode surface 12 allowed to take place. Then the remaining solution is removed and the housing 12 drained. The electrolyte 17 is added in a subsequent step and the capacitor assembly is then completed.

One particular advantage in utilizing a coating 18 of copper selenide, copper telluride or coppeer sulfide as opposed to conventional methods of increasing the cathode electrode surface area such as platinization and graphite coating is that many processing steps in the assembly of an electrolytic capacitor can be eliminated. For example, platinization of the interior surface of the cathode electrode requires the steps of masking, etching, rinsing, plating, rinsing and drying as set forth previously. The layers or coating 18 of the present invention may be provided simply by adding a small amount of an appropriate compound, for example, tellurous acid, to the fill electrolyte. This particular acid can be formed in acid electrolytes by adding the oxide of the element, for example, tellurium oxide ($TeO_2$), to the acid electrolyte such as sulfuric acid.

In the presently preferred method, the coating or layer over the cathode electrode is formed prior to the introduction of the fill electrolyte. In this method, the reactive compound is formed in an aqueous media, usually an aqueous solution of an acid such as $H_2SO_4$, and brought into contact with the cathode electrode surface 12. The reaction between the reactive compound and the copper component of the cathode electrode is allowed to take place to form the layer of copper telluride, copper selenide, or copper sulfide. In most situations, the optimum reaction time is between about five and twelve minutes. The presently preferred reaction time is eight minutes plus or minus two minutes. After the reaction, the solution is removed and the surface allowed to drain. Subsequently, the fill electrolyte is dispensed, the anode inserted, and the device sealed.

Thus, the method for providing the coating over the cathode electrode surface according to this invention is greatly simplified in comparison to the conventional methods such as platinization of the cathode electrode surface.

It is also advantageous to add certain soluble inorganic salts as depolarizers to the operating electrolyte of capacitors according to this invention as as to minimize leakage current effects present during capacitor operation. Such salts help to prevent the formation of gaseous products which are liberated due to leakage current between the electrodes. One particular salt that can be used advantageously with a capacitor according to this invention is $CuSO_4$, preferably in its hydrated form and with sulfuric acid electrolytes. The amount of salt needed is typically from about 0.1 wt.% to about 5 wt.% of the electrolyte.

Several capacitors made according to this invention and performance data for these capacitors are presented in the following examples. It should be understood that the examples are given for the purpose of illustration only and the examples do not limit the invention as has theretofore been described.

EXAMPLE I

A 450 uf capacitor of 6 volt rating is prepared according to the present invention.

A copper-based cathode housing composed of DCA #116 silver-copper, tough pitch, is fabricated with a length of about 0.677 inches and a diameter of about 0.187 inches. The interior of the housing is cleaned with a warm detergent solution and rinsed with de-ionized water and then the excess water drained. An electrolyte of de-aerated 39 wt.% $H_2SO_4$ with the addition of 0.4 wt.% $SeO_2$ is then poured into the housing. A sintered tantalum anode with a dielectric oxide coating and a length of about 0.503 inches is placed in the electrolyte and the open end of the housing sealed with an appropriate seal assembly.

The $SeO_2$ forms an acid in the electrolyte and reacts during and after filling with the copper of the interior surface of the cathode housing to produce an adherent layer of copper selenide. The finished capacitor exhibits good performance data on a foward life test at 85° C. and on shockvibration tests.

EXAMPLE II

A 78 uf capacitor of 50 volt rating is prepared according to the present invention.

The housing is the same size as the housing utilized in EXAMPLE I. Again the housing is cleaned by warm detergent solution and then rinsed with de-ionized water and drained. A treating solution of about one gram of $TeO_2$ in about 100 grams of 39 wt.% $H_2SO_4$ solution is dispensed into the housing, filling the housing to about 1/32 inch from the top of the housing. Reaction between the copper of the housing and the tellurous acid is allowed to take place to form the layer of copper telluride and then the housing is flushed with deionized water and dried at about 85° C.

After the housing is dry, electrolyte consisting of a de-aerated aqueous solution of about 39 wt.% $H_2SO_4$ with about 3 wt.% $CuSO_4 \cdot 5H_2O$ is dispensed into the housing. A sintered tantalum anode with a dielectric oxide film thereon is inserted into the electrolyte and the open end of the housing is closed by a seal assembly.

Two finished capacitors made by the above procedure are tested and are found to have the following electrical properties at various temperatures.

|  | Capacitance Change (% ΔC) | | | | |
| --- | --- | --- | --- | --- | --- |
|  | +25° C | −35° C | −55° C | +85° C | +25° C |
| Unit 1 | 80.4 uf 3.6%DF | −12 | −24 | −0.37 | −3.6 |
| Unit 2 | 81.2 uf 3.7%DF | −12 | −20 | −0.74 | −3.8 |
| Acceptable Limits |  |  | ±40 | ±10 | ±5 |

As can be noted from the above table, the performance of both capacitors is well within acceptable limits for temperature stability.

Forward life tests at 85° C. indicate that the above type capacitor is also within acceptable limits in terms of performance even after 1000 hours of testing. Percentage change in capacitance is less than 2% and usually less than 1%. D.C. leakage is well below the initial value and percentage change in dissipation factor is less than 10%, usually less then 5%, well within acceptable limits.

Thus the invention as has been described comprehends the use of a copper-based cathode electrode in an electrical device wherein a surface of the cathode electrode has an adherent layer or coating of a material selected from the group of copper selenide, copper telluride, copper sulfide or mixtures thereof. The layer is relatively easy and inexpensive to apply to the cathode electrode surface and permits the efficient utilization of copper-based materials as cathode electrodes for electrical devices, especially electrolytic capacitors.

While the present invention has been described with reference to particular embodiments thereof, it will be understood that numerous modifications may be made by those skilled in the art without actually departing from the spirit and scope of the invention as defined in the appended claims.

I claim:

1. A method of coating a cathode electrode for an electrolytic capacitor, consisting of the steps of: providing a copper-based cathode electrode and forming a layer of a compound of copper on a surface of the cathode electrode by contacting the surface with an electrolyte containing at least one compound reactive with copper, the reactive compound being selected from the group consisting of tellurium dioxide and selenium dioxide whereby the layer of the compound of copper is formed from the group consisting of copper telluride and copper selenide respectively.

2. The method as recited in claim 1 wherein the solution is tellurous acid formed by combining sulfuric acid and tellurium dioxide.

3. The method as recited in claim 1 wherein the solution is seleneous acid formed by combining sulfuric acid and selenium dioxide.

* * * * *